United States Patent [19]

Spaeh et al.

[11] Patent Number: 5,532,072
[45] Date of Patent: Jul. 2, 1996

[54] SERIALLY ARRANGED FUEL CELLS FOR LARGE SCALE POWER GENERATION

[75] Inventors: Richard Spaeh, Ueberlingen; Manfred Westphal, Bermatingen; Erich Erdle, Immenstaad; Klaus-Peter Zurell, Friedrichshafen, all of Germany

[73] Assignee: Dornier GmbH, Friedrichshafen, Germany

[21] Appl. No.: 279,650

[22] Filed: Jul. 25, 1994

[30] Foreign Application Priority Data

Jul. 24, 1993 [DE] Germany ............... 43 24 907.8

[51] Int. Cl.⁶ ............................................. H01M 2/00
[52] U.S. Cl. ...................... 429/34; 429/32; 429/35; 429/38; 429/39; 429/96
[58] Field of Search .................. 429/32, 34, 35, 429/38, 39, 96

[56] References Cited

U.S. PATENT DOCUMENTS

| 4,342,816 | 8/1982 | Kothmamn et al. | 429/38 |
| 5,079,105 | 1/1992 | Bossel | 429/32 |

*Primary Examiner*—Bruce F. Bell
*Attorney, Agent, or Firm*—Evenson, McKeown, Edwards & Lenahan

[57] ABSTRACT

A serially arranged construction of individual fuel cells implements large-scale systems for generating power. The fuel cells are packed with high density but in an exchangeable manner. Only the fuel gas is fed to the block of fuel cells by special conduits and connecting elements whereas the oxidation gas (e.g. air) is fed by an outside pressure difference between the front and rear sides of the fuel cell blocks. A large number of blocks can be mounted on a carrier plate in which fuel gas ducts are integrated to form a reinforcement and to directly feed the fuel gas into the blocks via pipe pieces mounted from the outside.

12 Claims, 8 Drawing Sheets

SERIALLY ARRANGED FUEL CELLS FOR LARGE SCALE POWER GENERATION

BACKGROUND AND SUMMARY OF THE INVENTION

The present invention relates to a construction for the serial arrangement of individual fuel cells for implementing large-scale systems for generating electric power, and more particularly, to fuel cells in a flat configuration and combined into a number of blocks connected to form modular units and operatively associated with fuel gas and oxidation gas conducting devices, electric connections corresponding carrier structures, sealing elements and thermal insulation.

Fuel cells are power converters which generate electric energy (direct current at low voltage) from the chemical energy of reactants (fuel gas and oxidants) in a direct manner; that is, without a diversion via a thermodynamic cyclic process. In contrast to accumulators, in the case of fuel cells, the reactants are not integral constituents of the system which are gradually exhausted during the operation, but are continuously supplied, with the fuel cell having only a converter function.

Since the electrochemical processes on fuel cells take place on the surface and not within the volume, many individual cells must be integrated into a larger block for the purpose of achieving sufficient power output. Increasing world-wide efforts are therefore being made to develop the fuel cells in a space-saving flat construction which clearly permit more favorable investment costs because of the higher power density and because of manufacturing advantages. These blocks can easily be combined to form larger systems with a higher output.

The operating temperatures of the fuel cell depend on the materials used for the cells and range between 50° C. (low temperature) and 1,000/° C. (high temperature). In comparison to the low-temperature cells, the high-temperature cell has a number of advantages. In addition to a higher power generating efficiency, the high-temperature cells may also be used, for example, for the reversal process of high-temperature electrolysis. In this case, hydrogen can be obtained from water vapor at approximately 800° to 1,000° C. with a high efficiency. For this reason, the above-mentioned object is preferably based on high-temperature cells. However, the construction must also be suitable for low-temperature cells.

U.S. Pat. No. 4,476,196 describes an arrangement in which a parallelepiped-shaped fuel cell block with four gas connection elements (manifolds), which are fixed to the block by a ceramic paste, is disposed in a housing. An elastic insulation mechanically decouples and thermally insulates the block from the housing. A disadvantage of this solution resides in the four manifolds (two manifolds respectively for the fuel gas and two respectively for the oxidation gas) which require high expenditures with respect to gas conducting structures and which also increase the risk of failure. This solution may be acceptable for a laboratory operation or the operation of only a few units, but it is not suitable for a serial arrangement of many units and of an increased output because of the high expenditures and space requirements.

It is, therefore, an object of the present invention to develop a construction which permits a high packing density of the blocks and reduces the expenditures with respect to gas conducting structures. It is a further object of the present invention to ensure that, at any time, the blocks can be exchanged, and the individual elements can be serviced and monitored while keeping the costs low and the reliability high.

According to the present invention, the foregoing objects have been achieved in that the fuel cell blocks are provided with gastight connection elements for fuel gas and exhaust gas, and with metal pipes for feeding fuel gas and returning exhaust gas takes, and the fuel cell blocks being configured so as to require no connection elements for the conducting of the incoming and outgoing air because, as a result of the physical separation of the front side and the rear side of the fuel cells and the pressure difference between the front and rear sides, the air flows through the corresponding ducts of the individual fuel cells, and a carrier plate separates the spaces between the front side and the rear side and fixes the fuel cell blocks and the associated fuel gas conducting pipes.

An advantage of the present invention is the fact that only the fuel gas is fed to the block by special conduits and connection elements. In contrast, the oxidation gas (such as air) does not require this feeding of gas because the gas flow is generated from the outside pressure difference between the front side and the rear side of the fuel cell block.

With respect to the approach taken in the aforementioned U.S. patent, it is particularly advantageous in accordance with the present invention that a series of fuel cell blocks can be mounted on a carrier plate with integrated fuel gas ducts so that a completely tested and operable integrated module in a tank configured to allow air flow through the fuel cell elements without any additional gas conducting structures and due only to the pressure difference between the front side and the rear side.

A large number of blocks (for example, twelve) can be mounted on a flat carrier plate, in which case the fuel gas ducts are as extensively as possible an integral component of the carrier plate in order to reinforce it corresponding to system requirements. A direct feeding of the fuel gas into the blocks takes place by pipe pieces which are additionally mounted from the outside. In contrast, the air requires no separate pipe because the blocks are closed off tightly with the carrier plate. Due to the pressure difference between the front side and the rear side of the blocks, the gas flows automatically through the corresponding ducts of the fuel cells. For generating the pressure difference, the carrier plate is pushed into a gastight tank which contains corresponding chambers for the feeding and removal of the gas and prevents a flow under the carrier plate by way of sealing strips.

BRIEF DESCRIPTION OF THE DRAWINGS

These and further objects, features and advantages of the present invention will become more apparent from the following detailed description thereof when taken in conjunction with the accompanying drawings wherein.

DETAILED DESCRIPTION OF THE DRAWINGS

Figure 1:
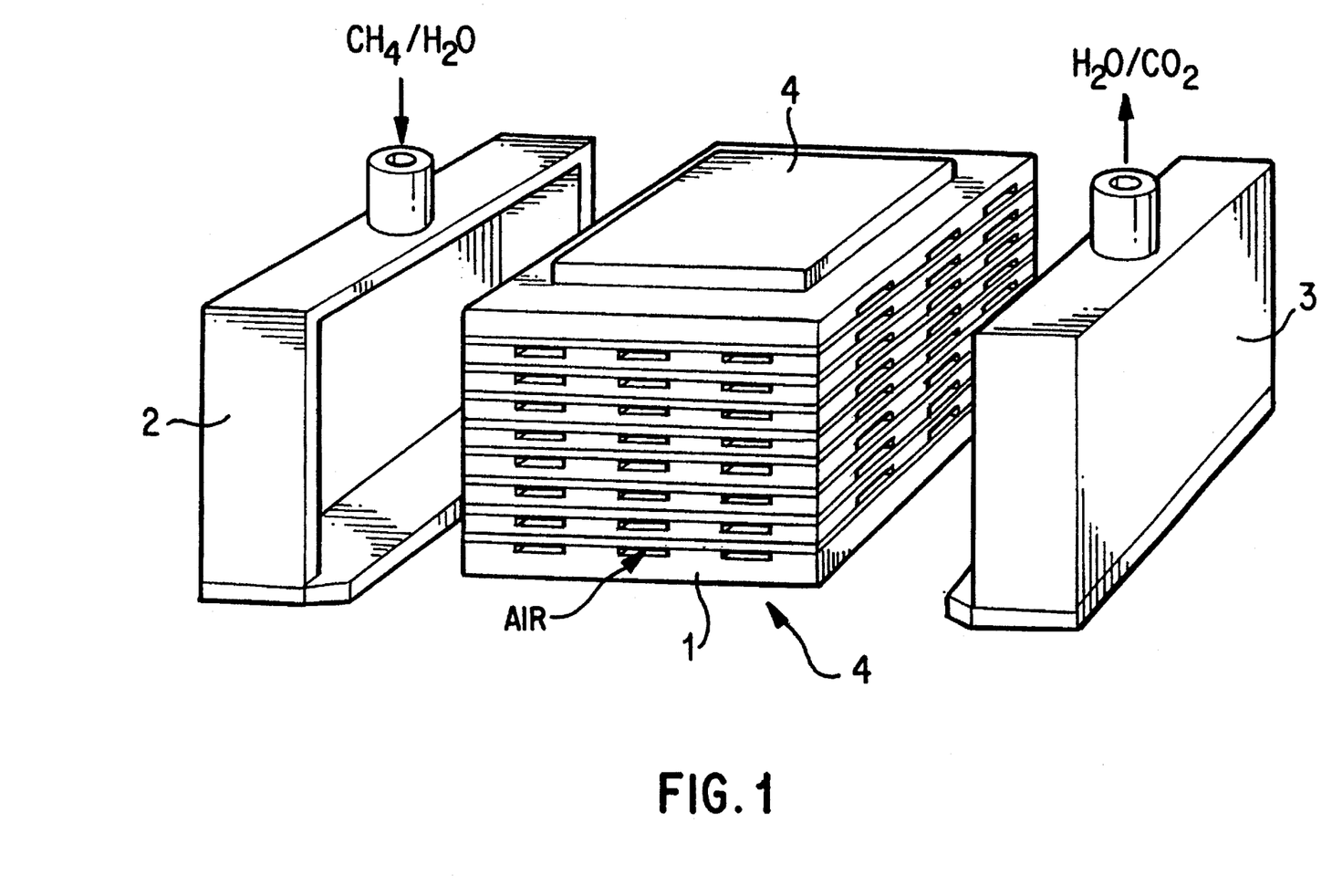
FIG. 1 is a schematic view of the basic construction of a fuel cell block.

FIG. 1 illustrates the basic construction of a fuel cell block 1 comprising many individual fuel cells which are serially stacked above one another and have connecting and gas conducting elements. In the case of fuel gas, the outside gas feeding required for the operation takes place via two connection elements 2, 3 which are connected in a gastight manner to the respective front side of the blocks 1. The fuel gas flows through the block 1 from the left to the right in the illustrated embodiment. In contrast, the air, which flows through the block 1 from the front to the rear, requires no connection elements. On the top side and the bottom side of the block 1, one current supply flag terminal 4, respectively, is provided to establish an electrical connection to the next block 1.

Figure 2:
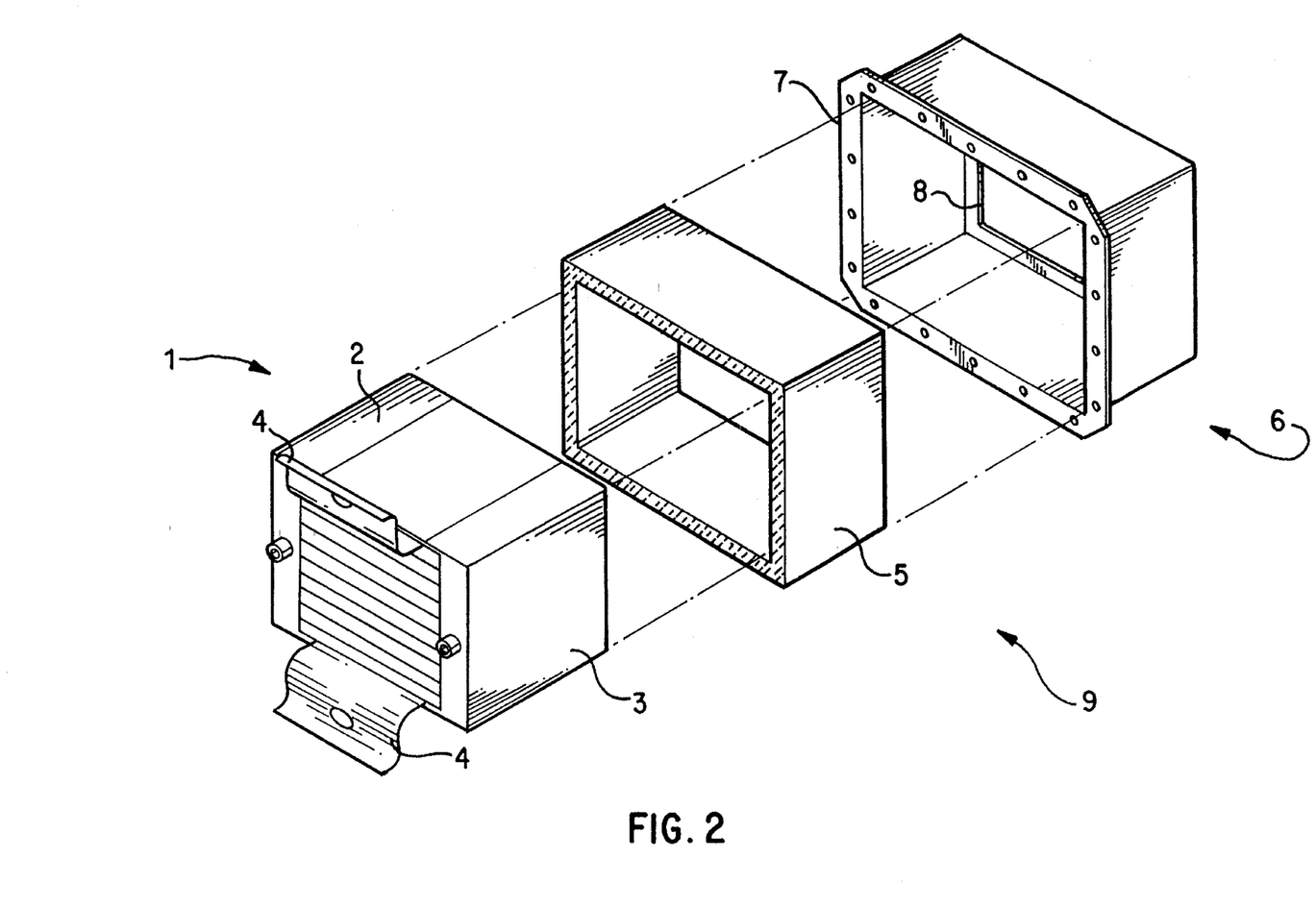
FIG. 2 is a schematic, exploded perspective view of the construction of a modular unit.

FIG. 2 illustrates an exploded view of the block 1 comprising an insulation 5 and a housing 6. In a manner similar to the above-mentioned U.S. Pat. No. 4,476,196, somewhat, the block 1 is disposed in a housing 6 and an interposed insulation 5. On one hand, the insulation 5 is used for the thermal decoupling of block 1 and housing 6 and, on the other hand, as a seal in order to prevent air from flowing around the block 1 in an unacceptable manner. Furthermore, the insulation is used for fixing the block 1 in the housing 6 so that the elasticity of the insulating material compensates for thermal deformations occurring between the block 1 and the housing 6 The fixing of the three elements takes place via a special high-temperature bonding agent. According to the requirements for a system, however, several fuel cell blocks 1 may also be stacked directly on one another without individually fixing each block. In this embodiment, the elastic insulation 5 and the housing 6 enclose the entire stack of blocks 1.

The housing 6 has two flanges 7, 8, the front flange 7 being used for fixing the modular unit 9 on the carrier plate 11, and the rear flange 8 acting as a stop in order to avoid the block 1 from being pressed out toward the rear of the housing. This modular unit 9 is the base element which is added serially in order to produce larger units with a higher output.

Figure 3:
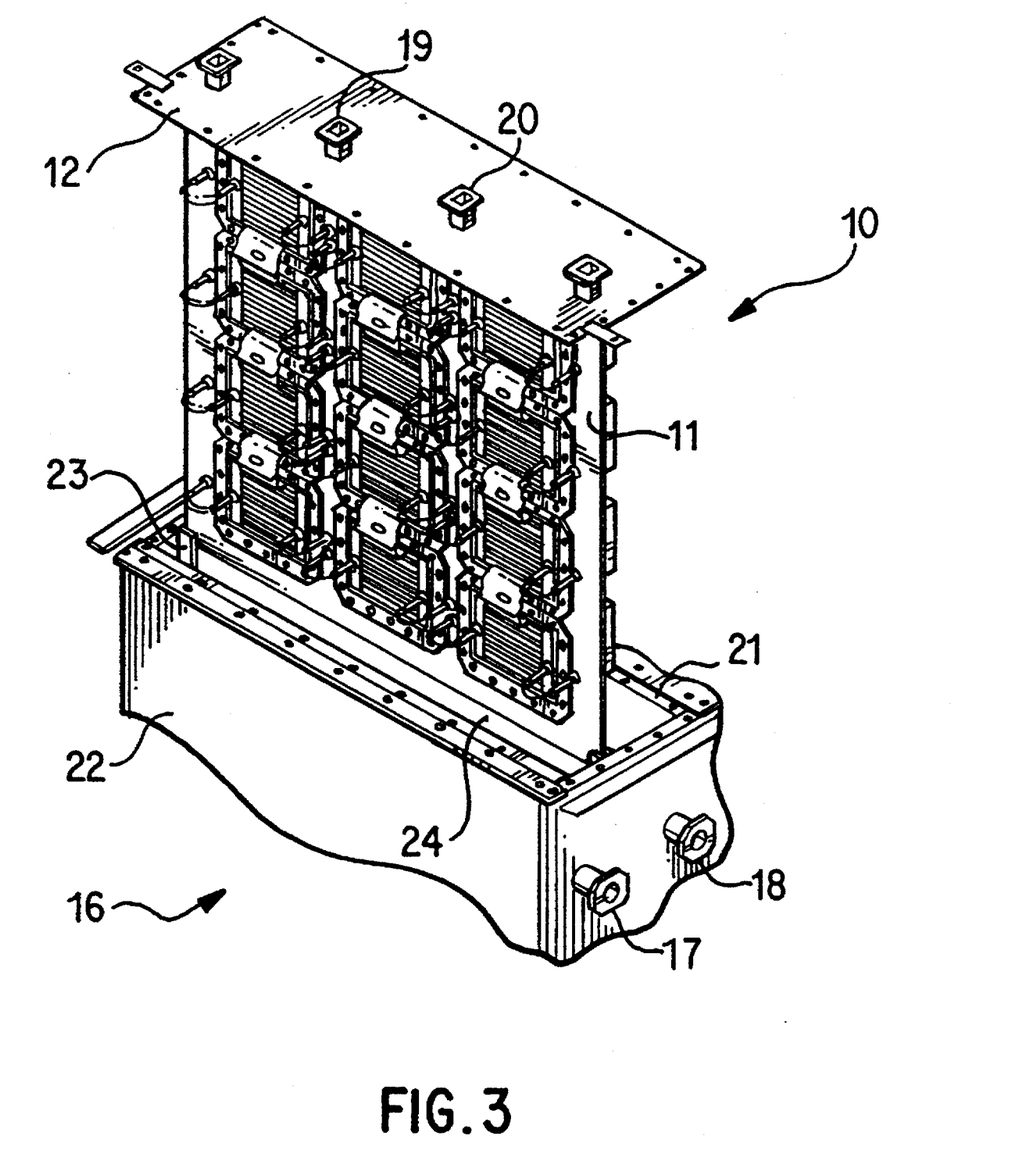
FIG. 3 is a perspective view of an entire fuel cell module with the tank.
Figure 4:
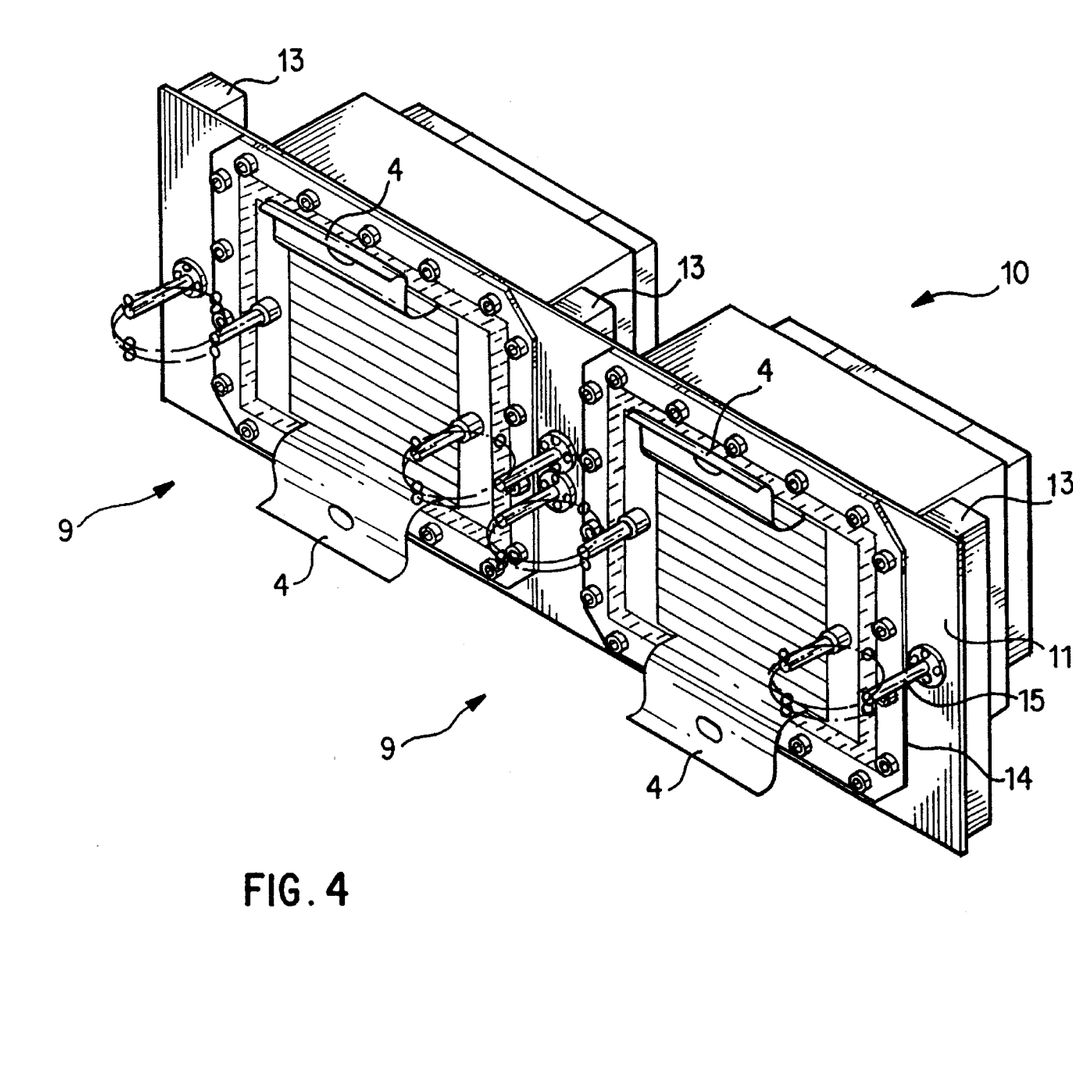
FIG. 4 is a perspective view of a detail of the mounting of two adjacent modular units.

FIG. 3 illustrates such a larger unit designated generally by the numeral 10 with twelve serially combined modular units 9. FIG. 4 illustrates a detail from FIG. 3 with two mounted modular units 9. This larger fuel cell module 10 has, in an end view, a T-shaped configuration and consists of a vertical carrier plate 11 with corresponding recesses and thread holes for the mounting of the modular units 9 as well as of a horizontal end plate 12 which is fastened on top and which is used primarily for the upper covering or sealing of the mounted fuel cell module 10 in a tank 16.

As seen in FIG. 4, the required fuel gas ducts 13 are mounted on the rear side of the carrier plate 11 so that the carrier plate 11 is also sufficiently reinforced as a result. Additional reinforcing ribs, which are not illustrated here, may also be necessary. The fuel gas ducts 13 (e.g., two feeding ducts and two discharge ducts) which are fastened in this manner project on top out of the horizontal end plate 12 in order to connect the further conduits of the fuel gas at this point.

The mounting of the modular unit 9 takes place, for example, by screws, rivets or the like. A seal 14 is arranged between the carrier plate 11 and the flange 7 of the modular unit 9, in order to also avoid an air flow therethrough. The connection of the fuel gas conduits from the fuel gas ducts 13 mounted in the carrier plate 11 to the modular units 9, depending on the connection, takes place by way of a curved pipe piece 15 which is connected to the carrier plate 11 by screwing, welding or the like and to the modular unit 9 by way of a receptacle. The shape of the pipe piece 15 is determined in a known manner to compensate for thermal deformations between the carrier plate 11 and the modular unit 9 without exceeding permissible tension.

The electric connection of the individual modular units 9 takes place by a welding-together of the current supply flag terminals 4 connected to the blocks 1. The two end poles of this arrangement are then led to the upper end plate and are connected there to the further current conductors.

For becoming operational, the thus integrated fuel cell module 10 is pushed into an especially shaped tank 16 which consists of an arbitrary number of chambers 24 which are open at the top and are bounded by partitions 22. The individual chambers 24 are separated into two spaces by the sliding-in of the fuel cell modules 10. One space respectively is for the feeding and the discharge of the air. The corresponding flanges for the incoming-air connection 17 and the outgoing-air connection 18 are mounted on the side of the tank 16. Two opposite rails 23 are used for guiding during the sliding-in of the fuel cell modules 10 and for sealing-off during the operation. The sealing takes place by way of sealing elements (not shown) which are situated between the vertical carrier plate 11 and the rail 19. The fixing of the fuel cell module 10 after being slid into the chamber 24 takes place by a screwing-together of the upper horizontal end plate 12 with the edge 21 of the chamber 24. For the sealing of this screwed connection, another seal is provided.

Figure 5:
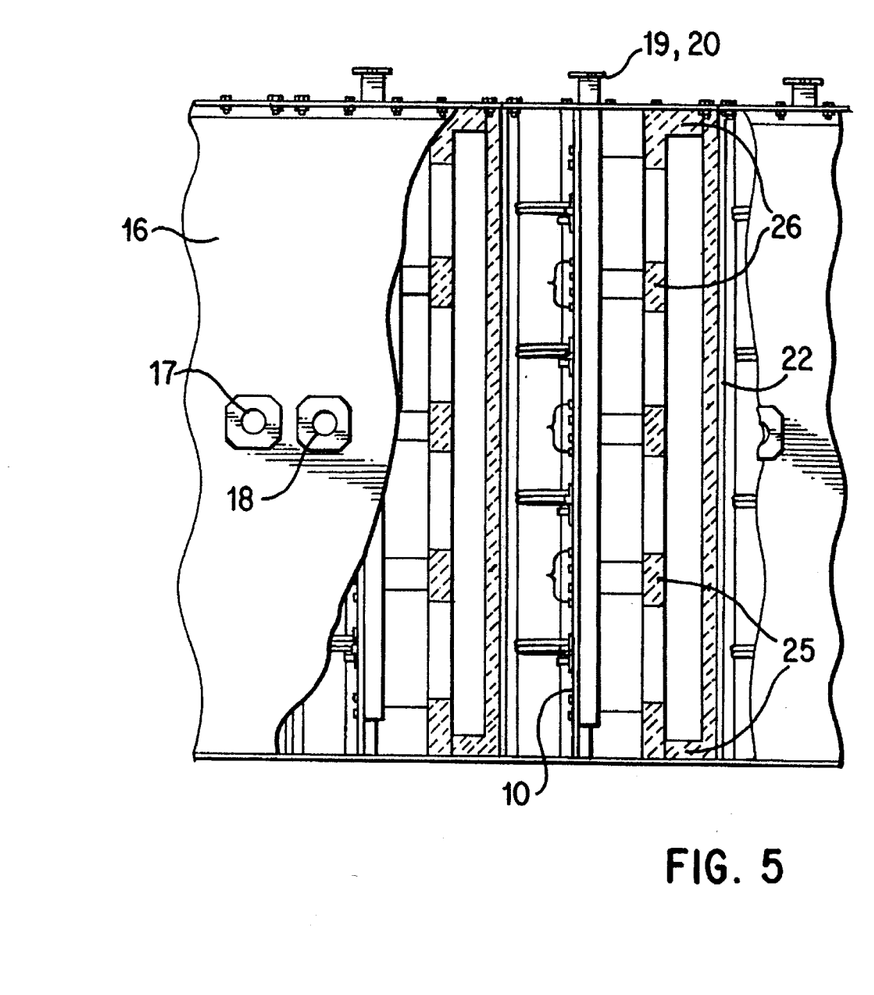
FIG. 5 is a schematic view of the arrangement of the insulation in the tank.
Figure 6:
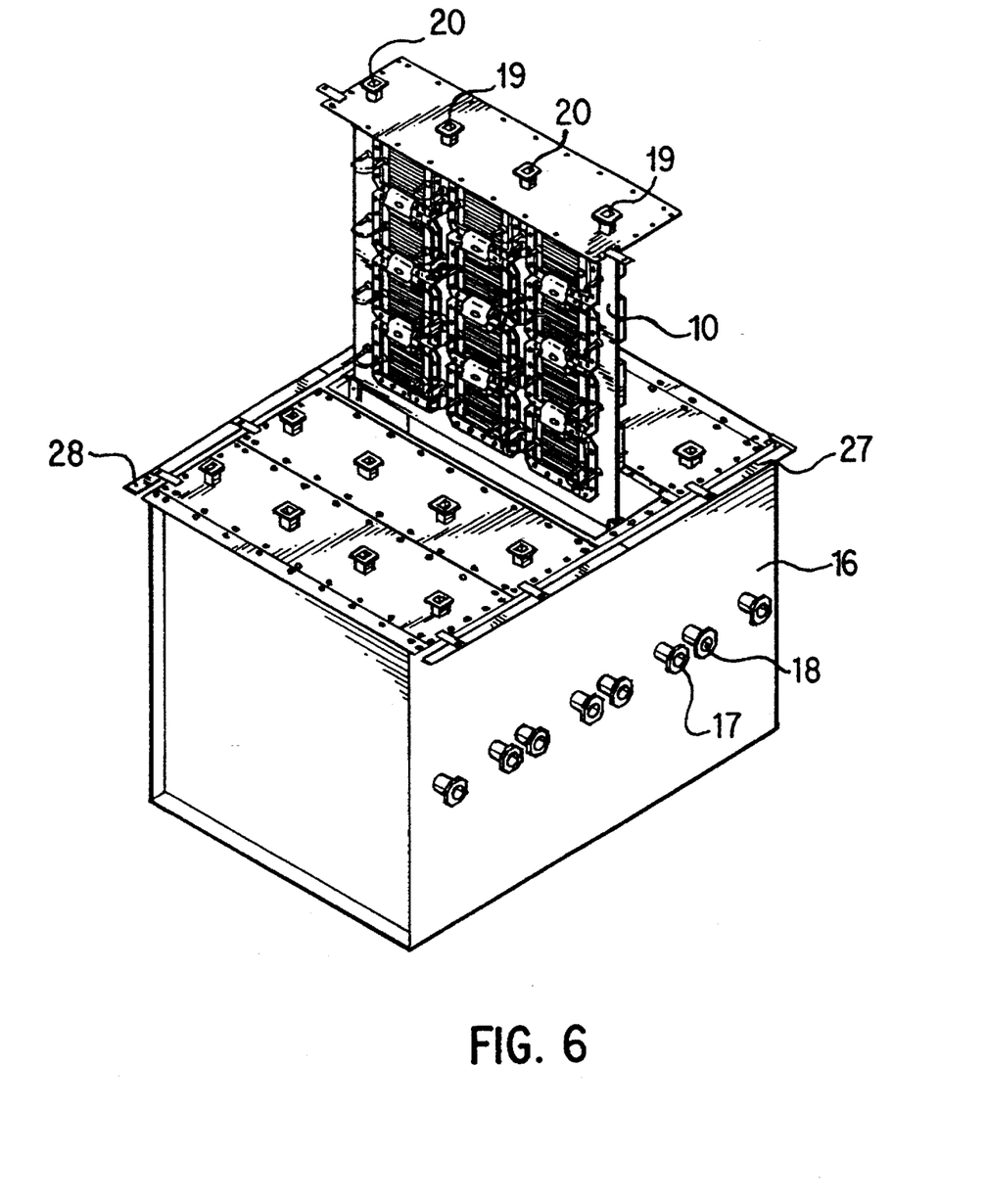
FIG. 6 is a perspective view of the serial arrangement of several fuel cell modules.

The preferred use of high-alloy steel or Ni-alloys for the tank 16 as well as for the modular structures requires that the temperature does not rise above 850° C. to 900° C. However, since, after leaving the fuel cells, the outgoing air has a temperature of approximately 1,000° C., an insulation on the exhaust gas side is necessary. FIG. 5 illustrates the insulation 25 for the thermal decoupling of the partition 22 and of the tank 16 as well as the insulation 26 for the decoupling of the rear side of the fuel cell module 10. A required reforming heat can be extracted from exhaust air through a reformer for at least partial preforming of the fuel gases in the tank 16. As an alternative, however, the insulation may also be completely or partially eliminated when the fed air, which has a temperature of 800° C., cools the corresponding metal parts to the permissible temperature. This advantageous construction can considerably reduce the costs of the system. FIG. 6 illustrates a serial arrangement of the above-described fuel cell modules with the corresponding connections for the fuel gas 19, 20 and for the air 17, 18 as well as the busbars 27, 28 for conducting the generated current.

Figure 7:
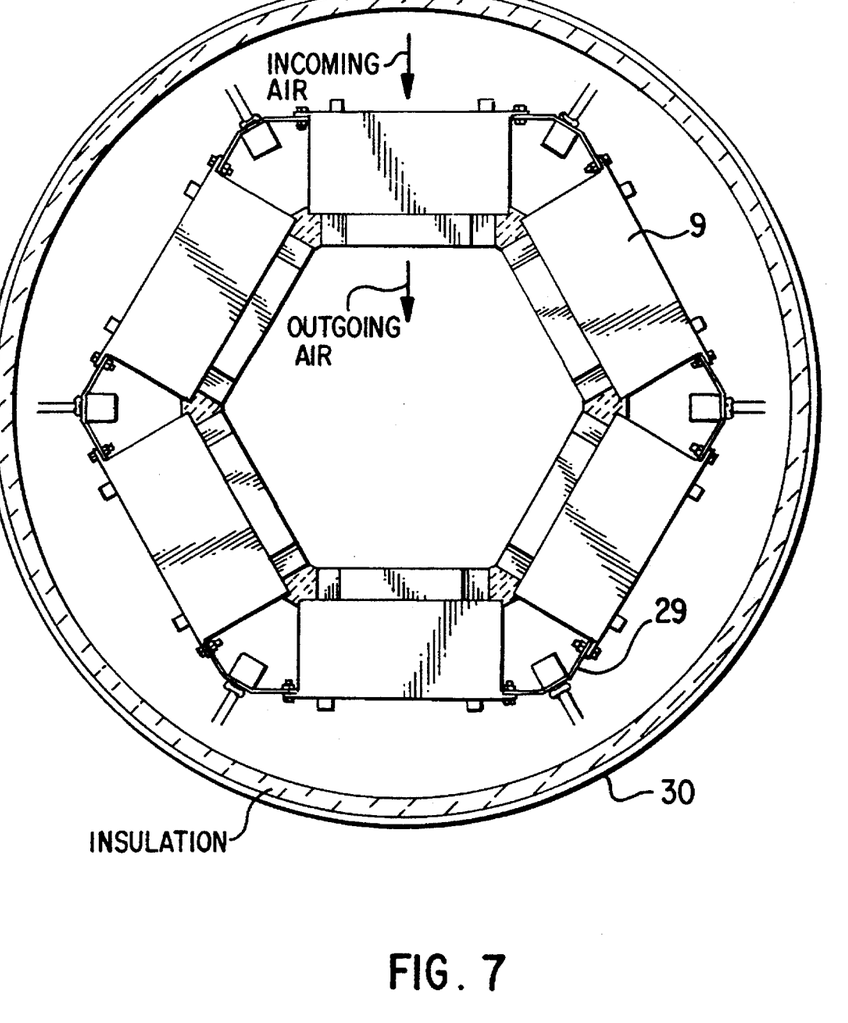
FIG. 7 is a schematic view of the serial arrangement of modular units in a carrier plate shaped as a polygon.

An advantageous further embodiment of the present invention is illustrated in FIG. 7 where flat carrier plates 11 are combined with mounted modular units 9 to form a polygon 29 so that a closed structural shell is formed which encloses an interior space. By way of a cylindrical pressure tank 30, which surrounds the polygon, two individually closed spaces are therefore obtained, i.e. an outside space for feeding air and an inside space for outgoing air. In comparison to the flat modular configuration, the advantage of this polygonal configuration is a housing which is better suited for high pressures although requiring higher space.

Figure 8:
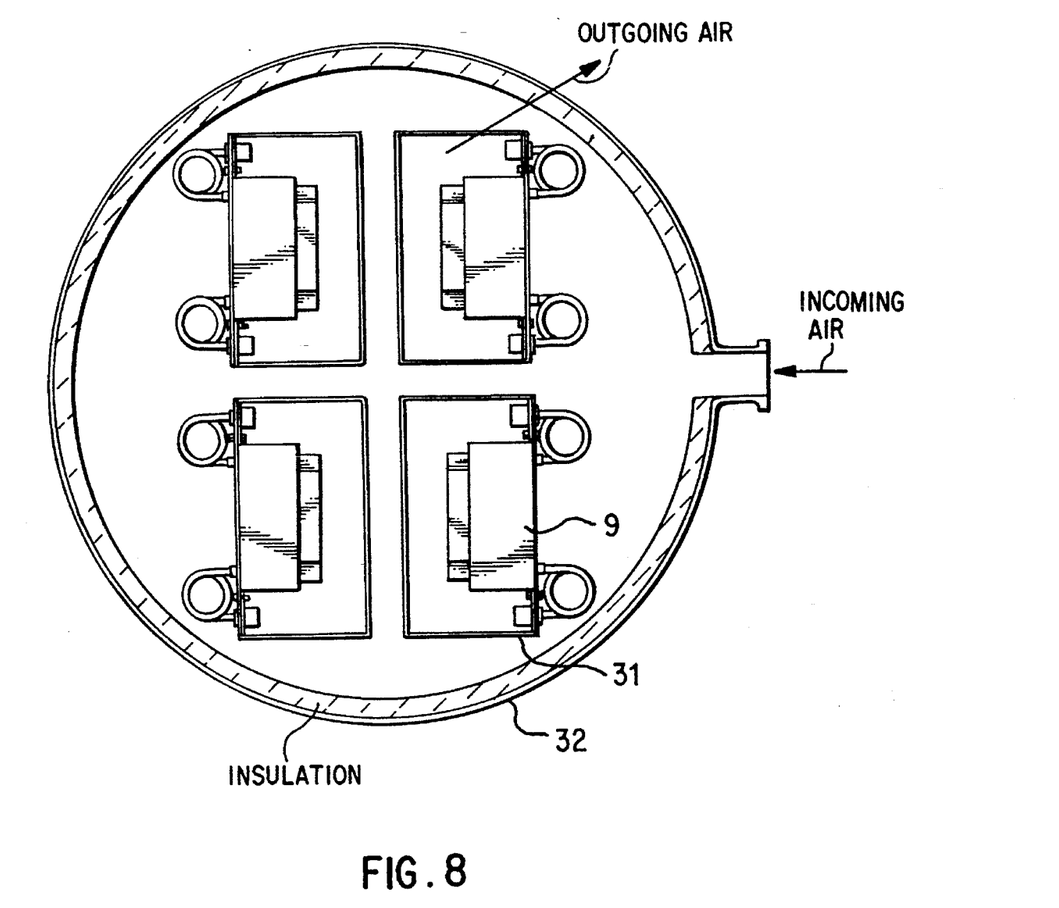
FIG. 8 is a schematic view of the serial arrangement of modular units stacked above one another in a carrier plate shaped as a tube.

Another advantageous embodiment of the present invention is illustrated in FIG. 8 where a carrier plate shaped to form a tube 31 encloses a number of modular units 9 mounted above one another so that the outgoing air can be discharged in this tube 31. The incoming air flows around the exterior side of the tube 31, whereby the wall temperature is reduced to a value at which an inside insulation of the tube 31 is not required. According to the system requirements, one or several of these tubes 31 (e.g., four, as shown in FIG. 8) may be connected in a cylindrical pressure tank 32 to form larger units. The advantage of this embodiment is also the application of high pressures as well as the cooling of the tube 31 by the colder incoming air.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A serially arranged fuel cell apparatus for power generation, comprising fuel cells in a flat configuration in blocks constituting modular units and operatively associated with fuel gas and oxidation gas conducting devices, electric connections, carrier structures, sealing elements and thermal insulation, gastight connection elements operatively associated with the modular units for fuel gas and exhaust gas and pipes are associated with the elements for feeding fuel gas and returning exhaust gas, wherein a front side and a rear side of the fuel cell blocks are physically separated to provide a pressure difference therebetween so that air flows through the corresponding ducts of individual fuel cells, without connection elements for conducting incoming and outgoing air, and a carrier plate arranging to separate spaces between the front side and the rear side and for fixing the fuel cell blocks and the associated fuel gas feeding pipes.

2. The apparatus according to claim 1, wherein elastic insulation arranged between each fuel cell block in a housing to compensate for thermal deformations between the housing and the block and to thermally insulate the block with the air-side gas pressure to the rear side of the fuel cell being sealed off.

3. The apparatus according to claim 1, wherein incoming air cools metallic components and the carrier structures of the fuel cell blocks.

4. The apparatus according to claim 1, wherein the fuel cells are electrolytic cells.

5. The apparatus according to claim 1, wherein the fuel cell blocks are electrically connectable one of in series and in parallel.

6. The apparatus according to claim 1, wherein fuel cell blocks are stacked directly on one another.

7. The apparatus according to claim 1, wherein the carrier plate is a flat plate and is integrated in a tank comprising flat structural elements.

8. The apparatus according to claim 1, wherein the carrier plate is one of a polygonal shape or a cylindrical shape, and is enclosed by a cylindrical tank.

9. The apparatus according to claim 1, wherein the carrier plates are arranged in pressure tanks.

10. The apparatus according to claim 1, wherein the carrier plates are arranged in a tank integrated into pressure tanks.

11. The apparatus according to claim 1, wherein a plurality of tanks are configured to form, in operative association with integrated fuel cell modules, power units and power plant systems.

12. A serially arranged fuel cell apparatus for power generation, comprising fuel cells in a flat configuration in blocks constituting modular units and operatively associated with fuel gas and oxidation gas conducting devices, electric connections, carrier structures, sealing elements and thermal insulation, gastight connection elements operatively associated with the modular units for fuel gas and exhaust gas and pipes are associated with the elements for feeding fuel gas and returning exhaust gas, wherein a front side and a rear side of the fuel cell blocks are physically separated to provide a pressure difference therebetween so that air flows through the corresponding ducts of individual fuel cells without connection elements for conducting incoming and outgoing air, and a carrier plate arranging to separate spaces between the front side and the rear side and for fixing the fuel cell blocks and the associated fuel gas feeding pipes wherein means is provided for at least a partial prereforming of the fuel gases in a metallic tank with a required reforming heat being extracted from the outgoing air.

* * * * *